United States Patent
Marzorati et al.

(10) Patent No.: US 11,854,264 B2
(45) Date of Patent: Dec. 26, 2023

(54) SPECULATIVE ACTIONS BASED ON PREDICTING NEGATIVE CIRCUMSTANCES

(71) Applicant: Kyndryl, Inc., New York, NY (US)

(72) Inventors: Mauro Marzorati, Lutz, FL (US); Paul Llamas Virgen, Zapopan (MX); Priyansh Jaiswal, Boca Raton, FL (US); Peeyush Jaiswal, Boca Raton, FL (US)

(73) Assignee: KYNDRYL, INC., New York, NY (US)

( * ) Notice: Subject to any disclaimer, the term of this patent is extended or adjusted under 35 U.S.C. 154(b) by 194 days.

(21) Appl. No.: 17/304,321

(22) Filed: Jun. 18, 2021

(65) Prior Publication Data

US 2022/0405510 A1 Dec. 22, 2022

(51) Int. Cl.
| | |
|---|---|
| G06V 20/40 | (2022.01) |
| G06N 3/08 | (2023.01) |
| G06V 10/75 | (2022.01) |
| G06V 20/20 | (2022.01) |
| G06F 18/2113 | (2023.01) |

(52) U.S. Cl.
CPC .......... G06V 20/48 (2022.01); G06F 18/2113 (2023.01); G06N 3/08 (2013.01); G06V 10/751 (2022.01); G06V 20/20 (2022.01)

(58) Field of Classification Search
None
See application file for complete search history.

(56) References Cited

U.S. PATENT DOCUMENTS

| | | | |
|---|---|---|---|
| 9,288,501 B2 | 3/2016 | Zheng | |
| 10,713,614 B1* | 7/2020 | Manyam | G06Q 10/087 |
| 10,977,518 B1* | 4/2021 | Sharma | G06V 10/774 |
| 11,048,973 B1* | 6/2021 | Ramanathan | G06V 10/774 |
| 11,620,511 B2* | 4/2023 | Valpola | G06N 3/08 |
| | | | 706/20 |
| 2005/0207622 A1* | 9/2005 | Haupt | G06V 40/172 |
| | | | 382/118 |

(Continued)

FOREIGN PATENT DOCUMENTS

| | | |
|---|---|---|
| JP | 5869122 B2 | 2/2016 |
| KR | 101202632 B1 | 11/2012 |

OTHER PUBLICATIONS

Liang, Yongqing, et al. "Video object segmentation with adaptive feature bank and uncertain-region refinement." Advances in Neural Information Processing Systems 33 (2020): 3430-3441. (Year: 2020).*

(Continued)

*Primary Examiner* — Michelle M Entezari
(74) *Attorney, Agent, or Firm* — Erik Swanson; Andrew M. Calderon; Calderon Safran & Cole P.C.

(57) ABSTRACT

A computer that identifies the video. The computer annotates the video using a deep learning tool. The computer analyzes the annotated video to highlight a dangerous condition. The computer identifies a video from a repository with the dangerous condition. The computer analyzes the video and the video from the repository using a similarity analysis. The computer determines a score based on the annotated video and based on comparing the video to the video from the repository and based on determining the score is above a threshold value, the computer generates an action.

18 Claims, 5 Drawing Sheets

(56) References Cited

U.S. PATENT DOCUMENTS

| | | | | |
|---|---|---|---|---|
| 2008/0103996 | A1* | 5/2008 | Forman | G06N 20/00 706/12 |
| 2009/0089108 | A1 | 4/2009 | Angell | |
| 2016/0093117 | A1* | 3/2016 | Ahn | G05B 23/024 701/29.3 |
| 2016/0133274 | A1 | 5/2016 | Conway | |
| 2016/0167226 | A1* | 6/2016 | Schnittman | G06V 20/10 901/1 |
| 2017/0185846 | A1* | 6/2017 | Hwangbo | G06V 10/40 |
| 2019/0080176 | A1* | 3/2019 | Lan | G06V 20/46 |
| 2019/0232955 | A1* | 8/2019 | Grimm | G06V 10/803 |
| 2019/0246112 | A1* | 8/2019 | Li | H04N 19/154 |
| 2019/0318165 | A1* | 10/2019 | Shah | G06F 3/0482 |
| 2019/0325259 | A1* | 10/2019 | Murphy | G06F 18/2148 |
| 2020/0111340 | A1 | 4/2020 | Johnson | |
| 2020/0184278 | A1* | 6/2020 | Zadeh | G06N 3/044 |
| 2020/0205697 | A1* | 7/2020 | Zheng | A61B 5/7264 |
| 2021/0030370 | A1 | 2/2021 | Stone | |
| 2021/0201391 | A1* | 7/2021 | Metev | G06V 40/20 |
| 2022/0031405 | A1* | 2/2022 | Kelley | G06V 10/25 |
| 2022/0326023 | A1* | 10/2022 | Xu | G01C 21/3807 |

OTHER PUBLICATIONS

Tang, Shuai, and Mani Golparvar-Fard. "Machine learning-based risk analysis for construction worker safety from ubiquitous site photos and videos." Journal of Computing in Civil Engineering 35.6 (2021): 04021020. (Year: 2021).*

Liu, Chang, et al. "Application of Ensemble Learning and Expert Decision in Fuzzy Risk Assessment of Railway Signaling Safety." 2022 IEEE 25th International Conference on Intelligent Transportation Systems (ITSC). IEEE, 2022. (Year: 2022).*

Naik, K. S., and Archana Bhise. "Risk Identification Using Quantum Machine Learning for Fleet Insurance Premium." International Conference on Computing, Communication and Learning. Cham: Springer Nature Switzerland, 2022. (Year: 2022).*

Mahendran, Nivedhitha, et al. "Sensor-assisted weighted average ensemble model for detecting major depressive disorder." Sensors 19.22 (2019): 4822. (Year: 2019).*

Chaubey, Pratima, et al. "Forest Fire Prediction System using Machine Learning." International Journal for Research in Applied Science and Engineering Technology 8.12 (2020): 539-546. (Year: 2020).*

Gondia, Ahmed, et al. "Machine learning-based construction site dynamic risk models." Technological Forecasting and Social Change 189 (2023): 122347. (Year: 2023).*

Vigdor, "Ikea Will Pay $46 Million to Parents of Toddler Crushed to Death by a Dresser," The New York Times, Published Jan. 6, 2020, https://www.nytimes.com/2020/01/06/US/ikea-dresser-lawsuit-settlement.html, 3 pages.

EngineerGuy, "How smoke detectors work," YouTube, Mar. 6, 2011, https://www.youtube.com/watch?v=oFUUQcpGR3k, 4 pages.

IBM, IBM TRIRIGA, IBM.com., Accessed Jun. 16, 2021, https://ibm.com/products/tririga, 12 pages.

Kwatra et al., "Embedding Contextual Information in an Image to Assist Understanding," Application and Drawings, Filed on Nov. 5, 2020, 36 Pages, U.S. Appl. No. 17/089,979.

McPhate, "Ikea Recalls 29 Million Chests and Dresses After 6 Children Die," The New York Times, Jun. 28, 2016, https://www.nytimes.com/2016/06/29/business/ikea-recall-tip-over-furniture.html, 3 pages.

Mell et al., "The NIST Definition of Cloud Computing", National Institute of Standards and Technology, Special Publication 800-145, Sep. 2011, 7 pages.

* cited by examiner

SPECULATIVE ACTIONS BASED ON PREDICTING NEGATIVE CIRCUMSTANCES

BACKGROUND

The present invention relates, generally, to the field of computing, and more particularly to environmental analysis using machine learning.

Machine learning (ML) is the study of computer algorithms that improve automatically through experience and by the use of data. Machine learning is seen as a part of artificial intelligence. Machine learning algorithms build a model based on sample data, known as training data or a training set, in order to make predictions or decisions without being explicitly programmed to do so. Machine learning algorithms are used in a wide variety of applications, such as in medicine, computer vision, and natural language processing where it is difficult or unfeasible to develop conventional algorithms to perform the needed tasks. A subset of machine learning is closely related to computational statistics, which focuses on making predictions using computers. The study of mathematical optimization delivers methods, theory and application domains to the field of machine learning. Data mining is a related field of study, focusing on exploratory data analysis through unsupervised learning. In its application across business problems, machine learning is also referred to as predictive analytics.

SUMMARY

According to one embodiment, a method, computer system, and computer program product for negative circumstance prediction of a video is provided. The present invention may include a computer that identifies the video. The computer annotates the video using a deep learning tool. The computer analyzes the annotated video to highlight a dangerous condition. The computer identifies a video from a repository with the dangerous condition. The computer analyzes the video and the video from the repository using a similarity analysis. The computer determines a score based on the annotated video and based on comparing the video to the video from the repository and based on determining the score is above a threshold value, the computer generates an action.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
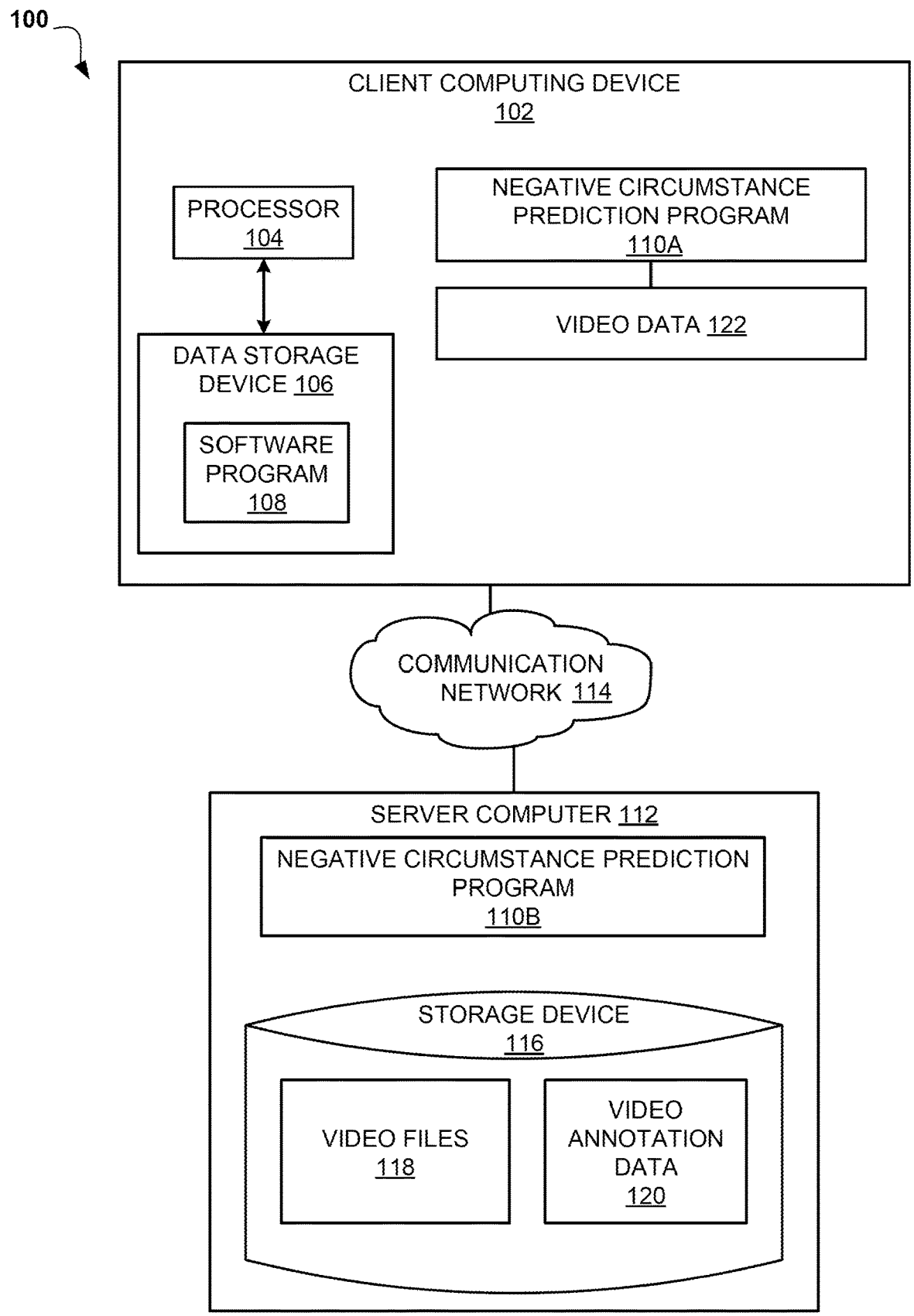
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to applying machine learning based analysis to video data in order to predict the outcome. The following described exemplary embodiments provide a system, method, and program product to, among other things, annotate a captured video and based on analyzing the annotations and comparing the video to similar recording, using machine learning, predict an outcome and take corrective action when the predictive outcome requires action be taken. Therefore, the present embodiment has the capacity to improve the technical field of environmental analysis using machine learning.

As previously described, Machine learning (ML) is the study of computer algorithms that improve automatically through experience and by the use of data. Machine learning is seen as a part of artificial intelligence. Machine learning algorithms build a model based on sample data, known as training data or training set, in order to make predictions or decisions without being explicitly programmed to do so. Machine learning algorithms are used in a wide variety of applications, such as in medicine, computer vision, and natural language processing where it is difficult or unfeasible to develop conventional algorithms to perform the needed tasks. A subset of machine learning is closely related to computational statistics, which focuses on making predictions using computers. The study of mathematical optimization delivers methods, theory and application domains to the field of machine learning. Data mining is a related field of study, focusing on exploratory data analysis through unsupervised learning. In its application across business problems, machine learning is also referred to as predictive analytics.

Oftentimes, especially in negligence causes of action, a company is held liable for an injury that one of the employees suffered because the company should have foreseen the outcome. As such, it may be advantageous to, among other things, implement a system that receives video data and by analyzing the video data using machine learning algorithms to identify an outcome and alert the user of the outcome or take actions to prevent it without human intervention.

According to one embodiment, a computer system may monitor a closed environment, for example a facility of a company, by recording and analyzing video data using machine learning techniques that annotate the captured recording to identify the objects and their movements. Then, the system may use another algorithm and compare the recording to a similar video with same objects that leads to an undesirable outcome and determine a first score such as a similarity score. Then, the system may determine whether the similarity score value is above a threshold and take a corrective action to prevent the outcome.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to analyze video data from a closed environment and predict dangerous conditions that may be mitigated in advance using machine learning analysis.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a negative circumstance prediction program 110A and communicate with the server 112 via the communication network 114, in accordance with one embodiment of the invention. In addition, client computing device 102 may store or have access to video data 122. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively. The video data 122 may be any series of digital photographs or a video recording captured by a camera or other video or photo recording device.

The server computer 112 may be a laptop computer, netbook computer, personal computer (PC), a desktop computer, or any programmable electronic device or any network of programmable electronic devices capable of hosting and running a negative circumstance prediction program 110B and a storage device 116 and communicating with the client computing device 102 via the communication network 114, in accordance with embodiments of the invention. The storage device 116 may store video files 118 and video annotation data 120. The video files 118 may be a video file repository that stores video files that has a specific negative circumstance associated with each file. The video annotation data 120 may be a database that stores annotation of each of the files stored in the video files 118 and may store annotation of video data 122 for machine learning analysis and training. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the negative circumstance prediction program 110A, 110B may be a program capable of receiving a video, predicting a negative circumstance and a score representing chances of that circumstance occurring by using annotation and image processing analysis of the received video, and acting according to the determined circumstance and the associated score. The negative circumstance prediction method is explained in further detail below with respect to FIG. 2.

Figure 2:
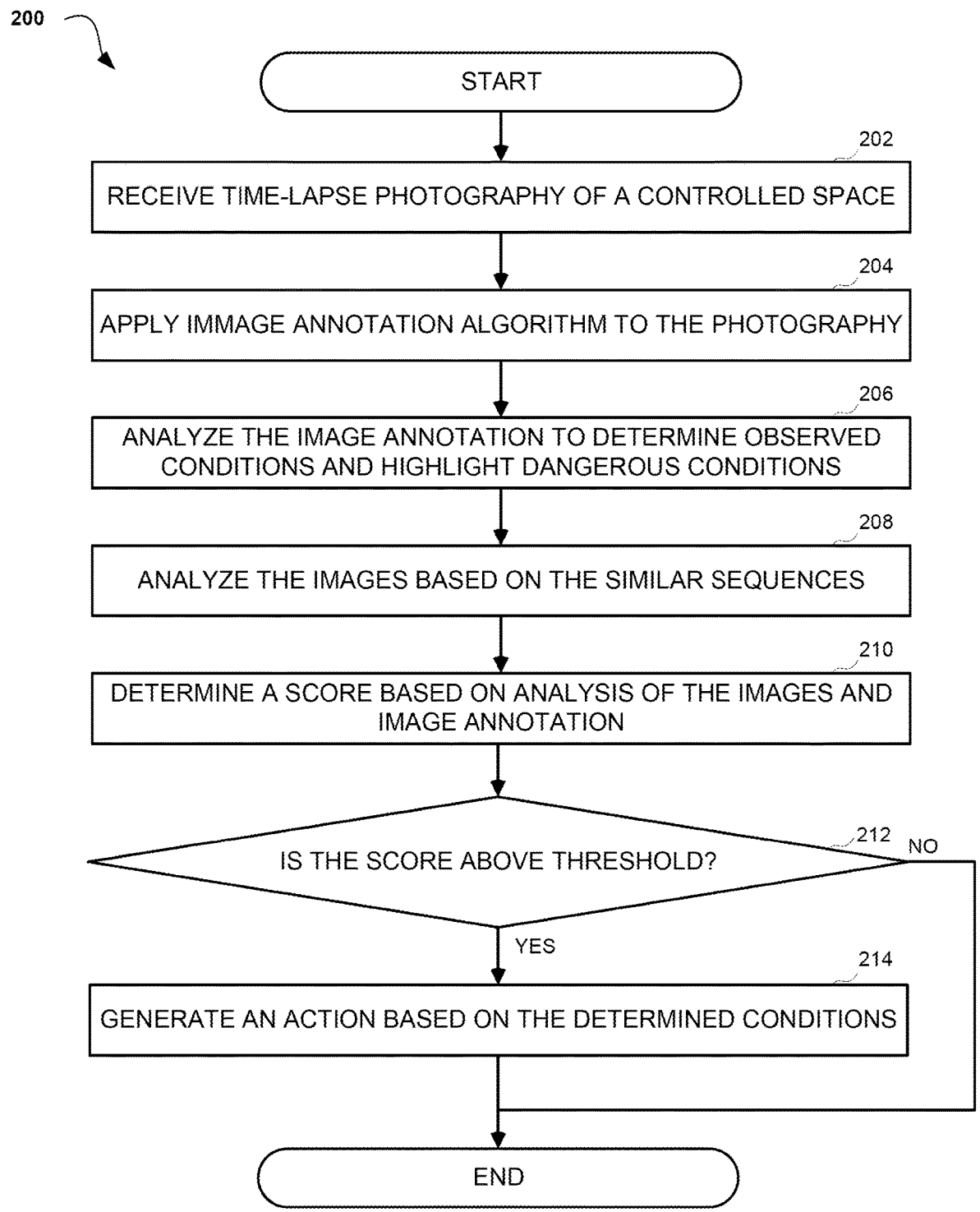
FIG. 2 is an operational flowchart illustrating a negative circumstance prediction process according to at least one embodiment.

Referring now to FIG. 2, an operational flowchart illustrating a negative circumstance prediction process 200 is depicted according to at least one embodiment. At 202, the negative circumstance prediction program 110A, 110B receives time-lapse photography of a controlled space. According to an example embodiment, the negative circumstance prediction program 110A, 110B may receive a video from an image capturing device, such as a mobile phone or any other device having a camera that may transfer the video data to the client computing device 102 and stores it in video data 122.

Next, at 204, the negative circumstance prediction program 110A, 110B applies an image annotation algorithm to the photography. According to an example embodiment, the negative circumstance prediction program 110A, 110B may use image processing algorithms to identify objects from the video data and the relations of the objects towards each other, including distances, velocities and accelerations of different objects. The negative circumstance prediction program 110A, 110B may utilize an adopted version of deep learning based automatic video annotation tools such as YOLO (you only look once algorithm) and Retinanet-50 that are typically used for annotating images for self-driving vehicles.

Then, at 206, the negative circumstance prediction program 110A, 110B analyzes the image annotation to determine observed conditions and highlight dangerous conditions. According to an example embodiment, the negative circumstance prediction program 110A, 110B may analyze the annotations using trained neural networks that predict or estimate an outcome of the annotations based on training samples. In addition, the negative circumstance prediction program 110A, 110B may review the annotation for specific object names or identifiers that are associated with dangerous conditions such as when smoke, fire or water are identified in the video data 122. For example, when an annotation includes fire as an object in the annotated video, the negative circumstance prediction program 110A, 110B may flag the annotation as having dangerous conditions.

Next, at 208, the negative circumstance prediction program 110A, 110B analyzes the images based on the similar sequences. According to an example embodiment, the negative circumstance prediction program 110A, 110B may identify a similar video file in video files 118 using matching techniques such as a similarity analysis of the annotation of the video data 122 to the video annotation data 120 that is associated with video file 118. For example, when a fire was identified in the annotation of video data 122 and one of the objects identified in the annotation was a carpet, the negative circumstance prediction program 110A, 110B may search the video annotation data 120 to find similar videos in video files 118 that also had a fire and a carpet.

Then, at 210, the negative circumstance prediction program 110A, 110B determines a score based on an analysis of the images and image annotation. According to an example embodiment, the negative circumstance prediction program 110A, 110B may assign a first score to the annotation analysis and the second score to the video analysis and generate a final score that is an average of the scores. For example, the score of the video analysis by the deep neural network may be a probability value that is associated with the output of the network, while the score of the annotation may be based on a number of objects associated with dangerous conditions. In another embodiment, the negative circumstance prediction program 110A, 110B may have a trained neural network that receives both scores and outputs a combined score. The neural network may be trained using a user input after each iteration. In another embodiment, the negative circumstance prediction program 110A, 110B may assign weights to each score and calculate the final score using weighted average.

Next, at 212, the negative circumstance prediction program 110A, 110B determines whether the score calculated from the video and annotation analyses is above a threshold value. The threshold value is assigned by a user based on the average score values in a specific field of application or according to user desires. If the negative circumstance prediction program 110A, 110B determines that the score is above a threshold value (step 212, "YES" branch), the negative circumstance prediction program 110A, 110B may continue to step 214 to generate an action based on the determined conditions. If the negative circumstance prediction program 110A, 110B determines that the score is below the threshold value (step 212, "NO" branch), the negative circumstance prediction program 110A, 110B may terminate.

Then, at 214, the negative circumstance prediction program 110A, 110B generates an action based on the determined conditions. According to an example embodiment, the negative circumstance prediction program 110A, 110B may send an alert to a user or use available devices to prevent the negative circumstance. For example, when the negative circumstance prediction program 110A, 110B determined a cigarette is laying on a carpet, the negative circumstance prediction program 110A, 110B may send a warning message to the user or send a command to the robot vacuum that is designed to vacuum smoldering objects in order to vacuum the carpet and prevent possible fire. In another embodiment, when the negative circumstance prediction program 110A, 110B determined a lamp is emitting smoke, the negative circumstance prediction program 110A, 110B may send a message to fire department or cut the power out.

It may be appreciated that FIG. 2 provides only an illustration of one implementation and does not imply any limitations with regard to how different embodiments may be implemented. Many modifications to the depicted environments may be made based on design and implementation requirements. According to an alternate embodiment, the negative circumstance prediction program 110A, 110B may be incorporated into a smart smoke detector that analyzes video of the environment the moment the smoke level exists (as measured by parts per million or parts per billion present in the air) but still below a value that is associated with the alarm and if the negative circumstance prediction program 110A, 110B determines that the probability of the fire is above the threshold the alarm is triggered even before the smoke level reaches the required level for alarm.

Figure 3:
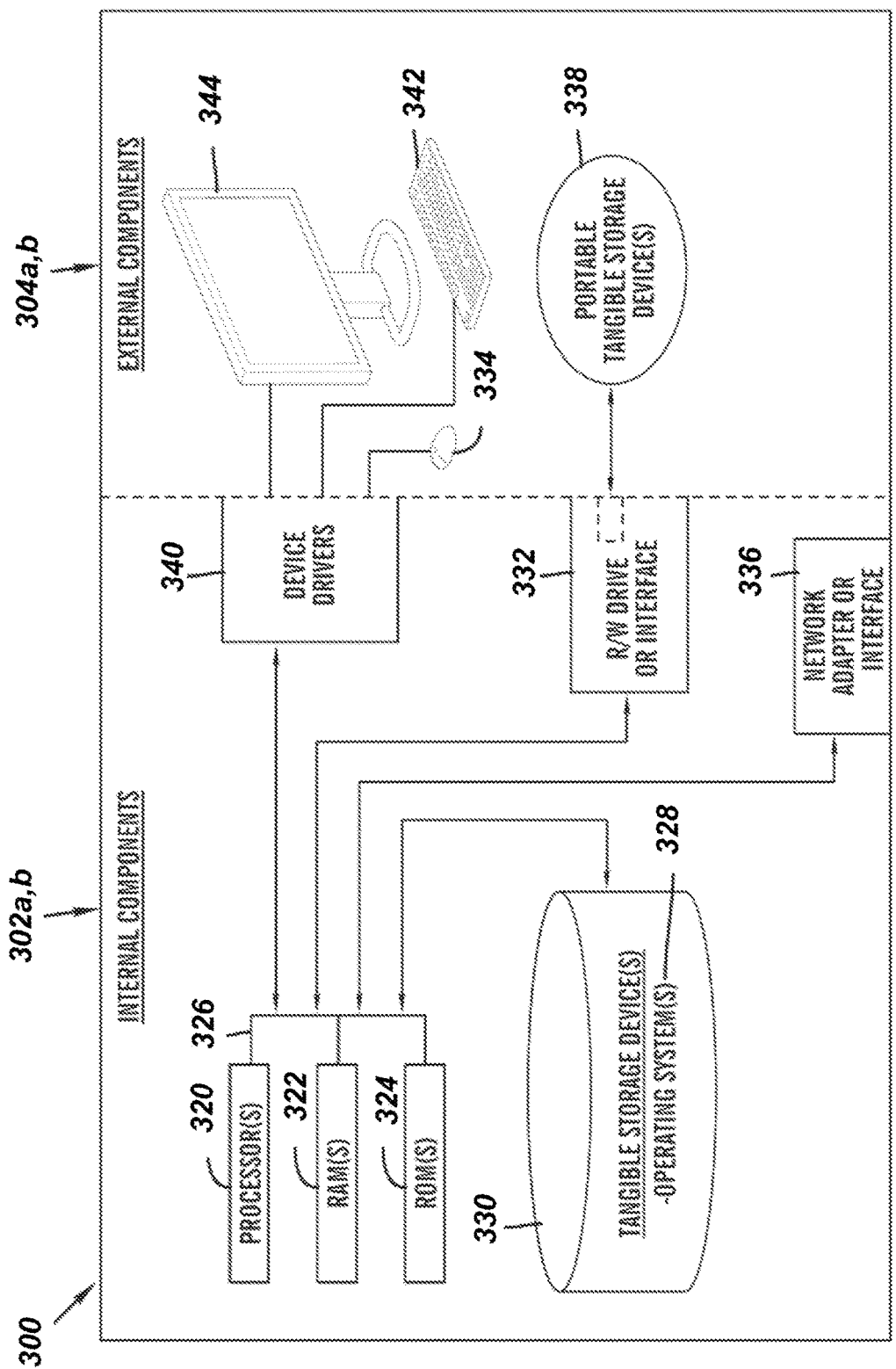
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 a,b and external components 304 a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the negative circumstance prediction program 110A in the client computing device 102, and the negative circumstance prediction program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the negative circumstance prediction program 110a, 110b, can be stored on one or more of the respective portable computer-readable tangible storage devices 338, read via the respective R/W drive or interface 332, and loaded into the respective hard drive 330.

Each set of internal components 302 a,b also includes network adapters or interfaces 336 such as a TCP/IP adapter cards, wireless Wi-Fi interface cards, or 3G or 4G wireless interface cards or other wired or wireless communication links. The software program 108 and the negative circumstance prediction program 110A in the client computing device 102 and the negative circumstance prediction program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the negative circumstance prediction program 110A in the client computing device 102 and the negative circumstance prediction program 110B in the server 112 are loaded into the respective hard drive 330. The network may comprise copper wires, optical fibers, wireless transmission, routers, firewalls, switches, gateway computers and/or edge servers.

Each of the sets of external components 304 *a,b* can include a computer display monitor 344, a keyboard 342, and a computer mouse 334. External components 304 *a,b* can also include touch screens, virtual keyboards, touch pads, pointing devices, and other human interface devices. Each of the sets of internal components 302 *a,b* also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
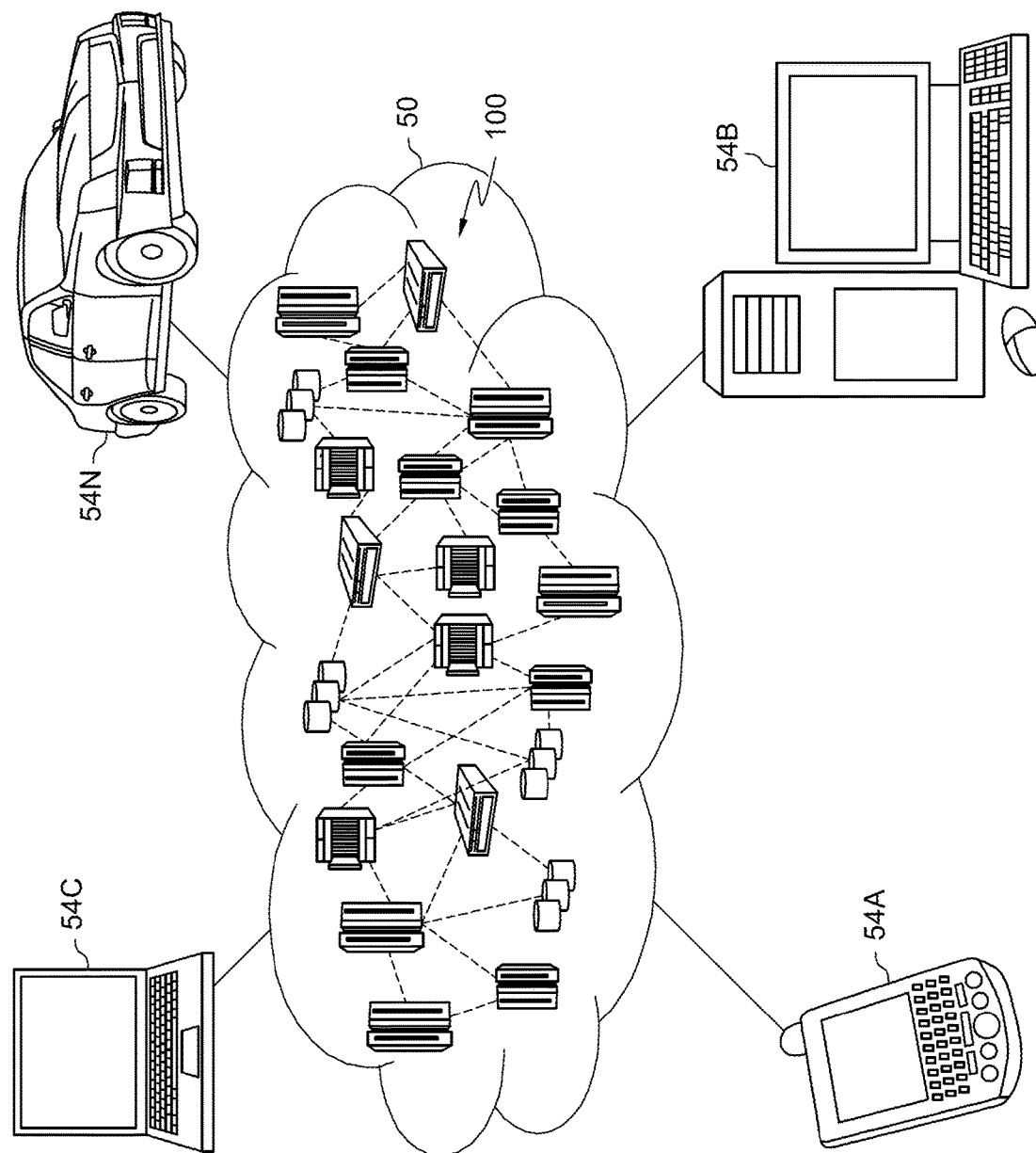
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
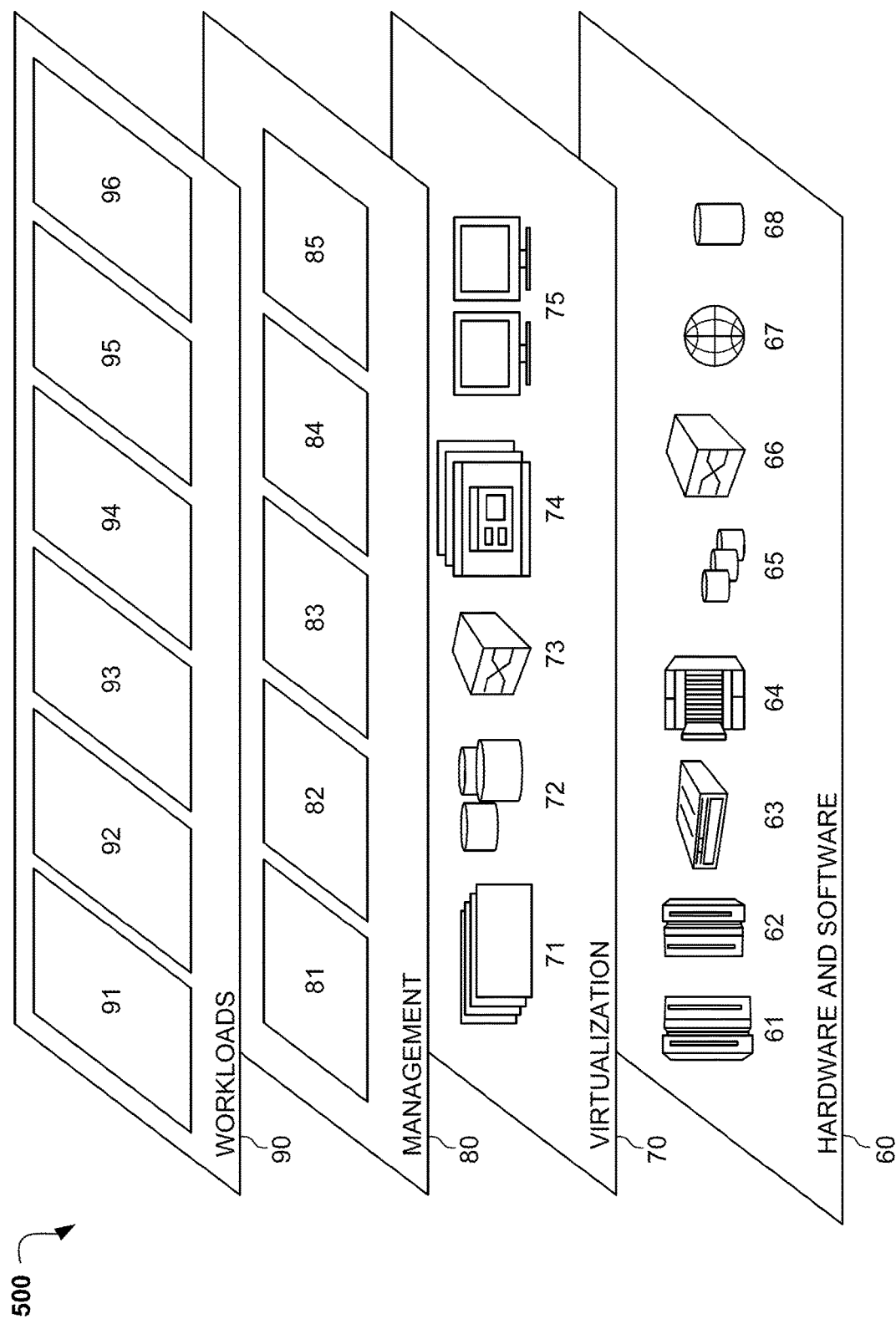
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and negative circumstance prediction 96. Negative circumstance prediction 96 may relate to annotating video data and, based on the annotation, predicting the circumstance by identifying video with similar annotations and comparing the video data to the identified video.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for negative circumstance prediction of a video, the method comprising:
identifying the video;
annotating the video, using a deep learning tool, with annotation data identifying one or more individual objects in a frame of the video, and providing annotated video;
analyzing the annotated video, including the annotation data of the annotated video, to identify a dangerous condition;
identifying a stored video from a repository with the identified dangerous condition;
analyzing the video and the stored video from the repository using a similarity analysis;
determining a final score based on a weighted average of a first score determined from the annotated video, a second score determined from the video analysis, and based on a comparison of the video to the stored video from the repository; and
based on determining the score is above a threshold value, performing an action to prevent the dangerous condition.

2. The method of claim 1, wherein the video is a time-lapse photography of a controlled space.

3. The method of claim 1, wherein the annotating is performed by an image processing algorithm that identifies the one or more objects from the video and one or more relations of the one or more objects towards each other.

4. The method of claim 1, wherein analyzing the annotated video is performed using a neural network that was trained using samples of the dangerous condition and predicts a potential outcome of the annotated video.

5. The method of claim 1, wherein the final score represents a chance of the dangerous condition occurring.

6. The method of claim 1, wherein the action comprises sending an alert to a user.

7. A computer system for negative circumstance prediction of a video, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
identifying the video;
annotating the video, using a deep learning tool, with annotation data identifying one or more individual objects in a frame of the video, and providing annotated video;
analyzing the annotated video, including the annotation data of the annotated video, to identify a dangerous condition;
identifying a stored video from a repository with the identified dangerous condition;
analyzing the video and the stored video from the repository using a similarity analysis;
determining a score based on a weighted average of a first score determined from the annotated video, a second score determined from the video analysis, and based on a comparison of the video to the stored video from the repository; and
based on determining the score is above a threshold value, performing an action to prevent the dangerous condition.

8. The computer system of claim 7, wherein the video is a time-lapse photography of a controlled space.

9. The computer system of claim 7, wherein the annotating is performed by an image processing algorithm that identifies the one or more objects from the video and one or more relations of the one or more objects towards each other.

10. The computer system of claim 7, wherein analyzing the annotated video is performed using a neural network that was trained using samples of the dangerous condition and predicts a potential outcome of the annotated video.

11. The computer system of claim 7, wherein the final score represents a chance of the dangerous condition occurring.

12. The computer system of claim 7, wherein the action comprises sending an alert to a user.

13. A computer program product for negative circumstance prediction of a video, the computer program product comprising:
  one or more computer-readable tangible storage medium and program instructions stored on at least one of the one or more tangible storage medium, the program instructions executable by a processor, the program instructions comprising:
    program instructions to identify the video;
    program instructions to annotate the video, using a deep learning tool, with annotation data identifying one or more individual objects in a frame of the video, and providing annotated video;
    program instructions to analyze the annotated video, including the annotation data of the annotated video, to identify a dangerous condition;
    program instructions to identify a stored video from a repository with the identified dangerous condition;
    program instructions to analyze the video and the stored video from the repository using a similarity analysis;
    program instructions to determine a score based on a weighted average of a first score determined from the annotated video, a second score determined from the video analysis, and based on a comparison of the video to the stored video from the repository; and
    based on determining the score is above a threshold value, program instructions to perform an action to prevent the dangerous condition.

14. The computer program product of claim 13, wherein the video is a time-lapse photography of a controlled space.

15. The computer program product of claim 13, wherein the annotating is performed by an image processing algorithm that identifies the one or more objects from the video and one or more relations of the one or more objects towards each other.

16. The computer program product of claim 13, wherein the program instructions to analyze the annotated video is performed using a neural network that was trained using samples of the dangerous condition and predicts a potential outcome of the annotated video.

17. The computer program product of claim 13, wherein the final score represents a chance of the dangerous condition occurring.

18. The computer program product of claim 13, wherein the action comprises sending an alert to a user.

* * * * *